United States Patent Office 2,996,553
Patented Aug. 15, 1961

2,996,553
CONDENSATION OF HEXACHLOROCYCLO-PENTADIENE
Arnold N. Johnson, Paterson, N.J., assignor to Hooker Chemical Corporation, Niagara Falls, N.Y., a corporation of New York
No Drawing. Filed June 27, 1955, Ser. No. 518,340
1 Claim. (Cl. 260—648)

The present invention is concerned with a process for the condensation of hexachlorocyclopentadiene with an unsaturated cyclic dieneophilic compound having five carbon atoms in the ring, in the presence of aluminum chloride.

The products of the aforesaid process are valuable as chemical intermediates for organic synthesis, for solvent uses and for the preparation of toxic substances such as insecticides, fungicides, etc.

The process may best be practiced by mixing about equimolar quantities of hexachlorocyclopentadiene and a five-carbon atom unsaturated cyclic dieneophilic compound; with or without a solvent reaction medium such as hexachlorobutadiene, carbon disulphide, petroleum ether, perchloroethylene, carbon tetrachloride, et cetera; adding between about 0.01 to about 1.0 mole of aluminum chloride per mole of hexachlorocyclopentadiene and, heating the reaction mixture to a temperature in the range between about 50 degrees centigrade and the refluxing temperature thereof. Preferably, the reaction is conducted at a temperature between about 65 degrees and 235 degrees centigrade, under the vapor pressure of the mixture at the temperature employed. The proportion of the organic reactants being condensed may be varied by using as much as one and one-half times the molar equivalent of a five-carbon atom unsaturated cyclic dieneophilic compound to about one-half mole thereof, per mole of hexachlorocyclopentadiene. The reaction time is affected by the thorough stirring of the reaction mixture and the temperature at which it is conducted, but requires only a few hours to go to completion after the mixture has attained a temperature above about 65 degrees centigrade.

Among the five carbon atom unsaturated cyclic dieneophilic compounds which may be condensed with hexachlorocyclopentadiene according to the present invention are hexachlorocyclopentadiene, cyclopentadiene, octachlorocyclopentene, cyclopentene, et cetera.

The following examples illustrate the practice of my invention, but are not to be construed as limiting the same:

Example I

One mole of hexachlorocyclopentadiene, dissolved in 7.0 moles of hexachlorobutadiene, and two-tenths mole of substantially anhydrous aluminum chloride is charged into a reactor provided with an agitator. The charge in the reactor is agitated, heated to a temperature of about 110 degrees centigrade and is maintained at that temperature for a period of five hours.

The product recovered is water-washed at room temperature to effect a removal of aluminum chloride, separated, and the bottom organic layer dried with anhydrous sodium sulfate. The dried product is fractionated under reduced pressure in an efficient column to remove hexachlorobutadiene and unreacted hexachlorocyclopentadiene. The residue is then cooled and a 45 percent yield of $C_{10}Cl_{12}$ recovered, based on the hexachlorocyclopentadiene charged to the process.

After purification by recrystallization from benzene, the snow-white crystals of $C_{10}Cl_{12}$ product sublimes above 240 degrees centigrade and analyzes 77.8 percent chlorine (theory 77.98 percent chlorine).

Example II

One mole of hexachlorocyclopentadiene, dissolved in one mole of perchlorothylene, and three-tenths mole of substantially anhydrous aluminum chloride is charged into a reactor provided with an agitator. The charge in the reactor is agitated, and heated to a temperature between 80 and 85 degrees centigrade. The reaction mixture is maintained at that temperature for a period of nine hours. The product recovered is washed by decantation, forming a semi-solid material, which is steam distilled. About 90 percent of the solvent is recovered by steam distillation, showing no appreciable reaction of the perchloroethylene. The remaining tan colored residue is filtered and recrystallized from benzene to give 168 parts of a white solid, which sublimes above 240 degrees centigrade without melting. This represents a yield of 62 percent $C_{10}Cl_{12}$ of theory, based on the cyclic reactant charged. Analysis indicates a chlorine content of 77.9 percent.

Example III

Three hundred and ninety-seven parts by weight of hexachlorocyclopentadiene and forty parts of anhydrous aluminum chloride is charged into a reactor provided with an agitator. The charge in the reactor is agitated, and heated to a temperature between 90 and 95 degrees centigrade for a period of one hour. At this stage of the reaction, the reaction mixture becomes extremely viscous. In order to reduce the viscosity, 457 parts by weight of carbon tetrachloride is introduced. The reaction is continued for an additional period of five hours at a temperature between 75 and 80 degrees centigrade. The reaction product is poured onto cracked ice, washed by decantation and steam distilled, whereupon substantially all of the carbon tetrachloride is removed. The resulting tan colored solid is purified by recrystallization from benzene, to yield 268 parts by weight of a white solid which sublimes at a temperature above 240 degrees centigrade, and shows a chlorine content of 77.9 percent. This represents a conversion of 68 percent to $C_{10}Cl_{12}$ of theory, based on the amount of hexachlorocyclopentadiene charged.

Example IV

In the same manner, but at a temperature of about 40 degrees centigrade, one gram-mole of cyclopentene is condensed with one gram mole of hexachlorocyclopentadiene, in the presence of 0.1 mole of aluminum chloride. By treatment of the reaction product as outlined in Example I, $C_{10}H_8Cl_6$, a white crystalline product softening above 240 degrees centigrade is obtained in yield above 20 percent, based on the hexachlorocyclopentadiene charged to the process. This product may readily be chlorinated, without destruction of its carbon skeleton, to yield valuable toxic products.

Example V

The procedure outlined in Example I was repeated and the product recovered in the same manner depicted therein except that instead of a 45% yield of the $C_{10}Cl_{12}$ dimer based on the hexachlorocyclopentadiene charged to the process, a 62% yield was isolated.

After purification of the $C_{10}Cl_{12}$ product by recrystallization from benzene, the white crystals of $C_{10}Cl_{12}$ which sublimed above 240 degrees centigrade and analyzed 77.9% chlorine was determined to possess the following additional characteristics: a melting point (sealed tube) of 484–486 degrees centigrade, a carbon content of 22.42% and a hydrogen content of 0.0002%. This chlorocarbon, because of its high molecular weight and high melting point is insoluble or only sparingly soluble in most ordinary solvents. It is sparingly soluble in such solvents as dichlorobenzene, toluene, xylene, chloroform, methylene chloride, hexachlorobutadiene and perchloroethylene when they are hot. The solubility of the $C_{10}Cl_{12}$ dimer in dichlorobenzene was determined at various temperatures as follows:

Temperature, °C.: Gms. solute/100 gms. solvent
- 20 _____ 6.7
- 30 _____ 7.5
- 42 _____ 9.0
- 52 _____ 9.6
- 72 _____ 12.5
- 110 _____ 19.0

Alternatively, the $C_{10}Cl_{12}$ dimer of $C_5Cl_6$ of this invention may be prepared by the process depicted in the following series of equations:

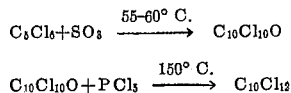

The reaction of $C_5Cl_6$ with $SO_3$ which is depicted in the first equation, is more fully disclosed in copending application, S.N. 238,186, filed July 23, 1951, now abandoned, by E. T. McBee and J. S. Newcomer. The second reaction is illustrated in the next example.

*Example VI*

A dry Carius tube was filled with 5 g. of dry $C_{10}Cl_{10}O$ made by heating $C_5Cl_6$ and $SO_3$ and 20 g. of phosphorous pentachloride, flushed with nitrogen, then healed. The sealed tube was heated in a Carius furnace to a temperature up to 150 degrees centigrade for a period of over two hours and held at this temperature for an additional three hours. After cooling and opening the tube, the reaction mixture was slurried with water to remove excess phosphorous chloride. A white precipitate formed and was separated from the aqueous media by filtration. The precipitate was washed several times with water and eventually slurried several times with methanol, then dried to yield 1.12 g. of the $C_{10}Cl_{12}$ dimer as a white powder having a melting point of 483–487 degrees centigrade with decomposition. The aqueous filtrate was worked up and resulted in recovery of 3.97 g. of the original starting material $C_{10}Cl_{10}O$. This represents a conversion of 20.6 percent of $C_{10}Cl_{10}O$ to $C_{10}Cl_{12}$ and a yield of 97 percent.

Still another method for preparing the $C_{10}Cl_{12}$ compound of this invention comprises reacting 1,1,2,3,4,5,5,5-octachloro pentene-1 with aluminum chloride. This is further illustrated in the next example.

*Example VII*

A mixture of 51.9 g. of 1,1,2,3,4,5,5,5-octachloro pentene-1 dissolved in 100 ml. of methylene chloride and 10 g. of substantially anhydrous aluminum chloride was refluxed for approximately fifteen hours. Hydrogen chloride was evolved while the reaction proceeded. After the reflux period was completed, the reaction mixture was poured into ice-water, acidified, then thoroughly washed with water and dried. The solvent was evaporated to leave a tan solid that was recrystallized from benzene twice to yield the $C_{10}Cl_{12}$ dimer as white crystals (12.3 g.) that had a melting point of 483–487 degrees centigrade with decomposition. An equal mixture of this product and that obtained in Example V did not result in a depressed melting point.

*Example VIII*

The procedure outlined in Example I was repeated except that the ratio of reactants to solvent was 1 to 1, the reaction temperature was 115 degrees centigrade and the reaction time was twelve hours. The product was recovered in the same manner as depicted therein except that a 91 percent yield of $C_{10}Cl_{12}$ having a melting point of about 485 degrees centigrade based on the hexachlorocyclopentadiene charged to the process was isolated.

Because of the high melting point and high chlorine content and high flash point, the compound is useful as an additive for imparting fire retardance and retarding after glow to organic plastics, particularly when compounded with antimony salts, such as the oxides.

The product of this invention is useful as a chemical intermediate in that it enters into the reaction depicted in the following equation under the conditions specified.

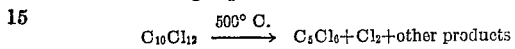

This reaction is further illustrated in the following example.

*Example IX*

One mol of the dimer of hexachlorocyclopentadiene $C_{10}Cl_{12}$ was charged to a reaction vessel provided with heating means, and equipped with a gaseous recovery system including a condenser. The charge was heated to a temperature of about 500 degrees centigrade to effect the decomposition of the product and cause the formation of hexachlorocyclopentadiene which was separately recovered.

The utility of hexachlorocyclopentadiene in Diels-Alder and other reactions for making commercial insecticides and resins is well established as exemplified in previously issued patents and publications.

The compound is also useful as an insecticide as evidenced from the following data which was assembled by the procedure described in the following example.

*Example X*

A 25 percent by weight dust of the dimer $C_{10}Cl_{12}$ having a melting point of 483 to 487 degrees centigrade was made by intimately mixing the dimer with a solid inert carrier, such as talc. This formulation which had the $C_{10}Cl_{12}$ dimer as the only insecticidal active ingredient, produced a 75 percent knock-down in a period of twenty-four hours, when applied in a contact knock-down test to the confused flour beetle (*Tribolium confusum*). This indicates the usefulness of the compound as an ingredient in insecticidal compositions, contributing high-knockdown quality thereto. The dust is equally effective against other species of insects and this example is not to be construed as limiting the insecticidal usefulness of the compound.

This application is a continuation-in-part of my copending application S.N. 757,321, filed June 20, 1947, now United States Patent 2,724,730, issued November 22, 1955, entitled, "Condensation of Hexachlorocyclopentadiene."

I claim:

The dimer of hexachlorocyclopentadiene having the formula $C_{10}Cl_{12}$ and having a melting range of 483 degrees to 487 degrees centigrade.

References Cited in the file of this patent

UNITED STATES PATENTS

| | | |
|---|---|---|
| 2,671,043 | Gilbert | Mar. 2, 1954 |
| 2,724,730 | Johnson | Nov. 22, 1955 |

OTHER REFERENCES

Prins: "Rec. des trav. chim. des Pays-Bas," vol. 65, pages 455–67 (1946).